2,145,653

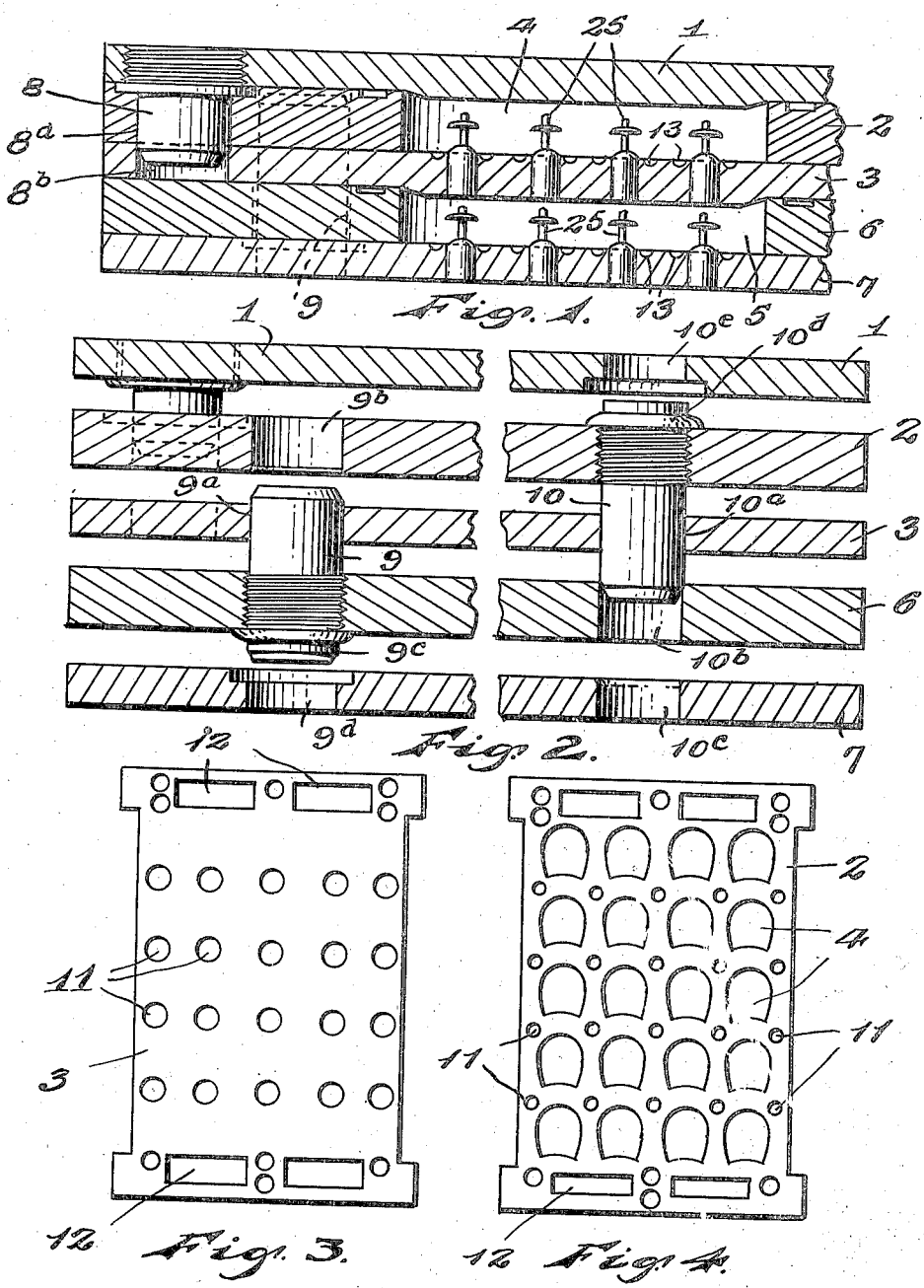

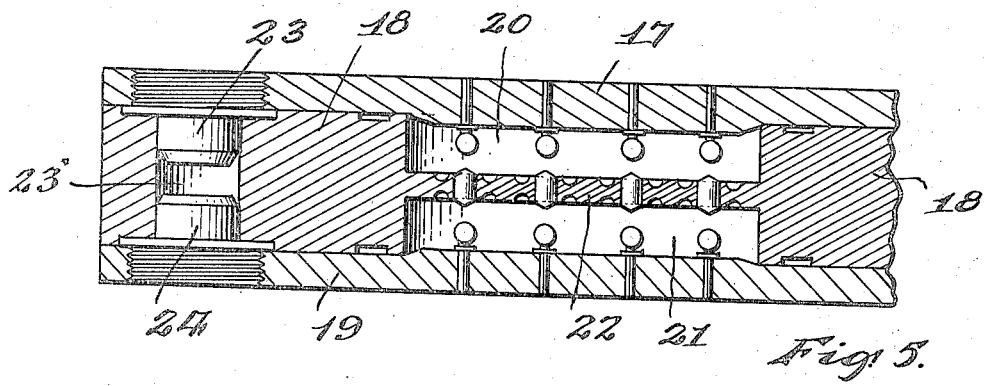
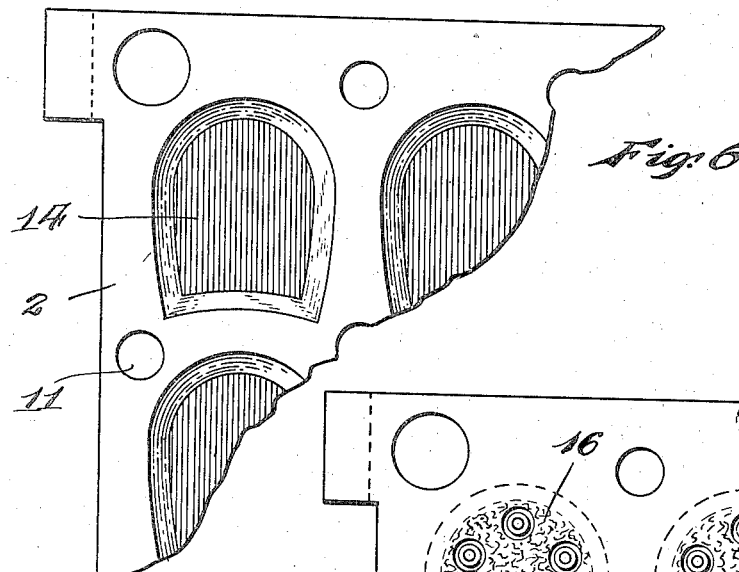
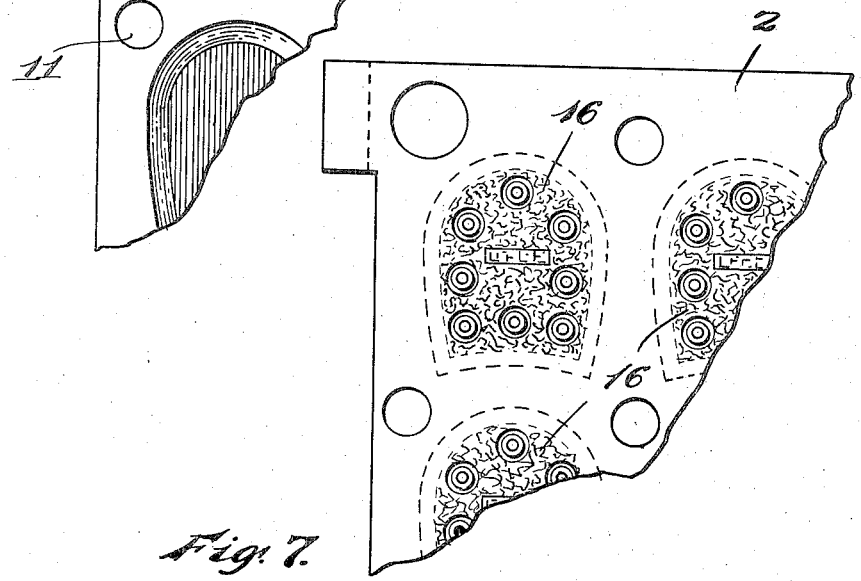
INVENTORS:
Carlos Hall,
Fernando Hall,
By Christian L. Nielsen
ATTORNEY Patented Jan. 31, 1939

UNITED STATES PATENT OFFICE 2,145,653

DOUBLE CAVITY MOLD FOR MANUFACTURE OF RUBBER HEELS AND THE LIKE

Carlos Hall and Fernando Hall, Mexico, D. F., Mexico, assignors of one-third to Harry H. Hallett, Mexico, D. F., Mexico Application September 30, 1937, Serial No. 166,692
In Mexico November 12, 1936

3 Claims. (Cl. 18—42)

This invention relates to a mold for vulcanizing rubber heels for shoes and the like, and it consists in the constructions, arrangements and combinations herein described and claimed.

It is an object of the invention to provide a composite mold having dual mold cavities permitting production of twice the number of heels in one operation than is possible with a single cavity mold.

It is also an object of the invention to provide a mold of a dual type in which the "over all" dimension of the mold is no greater than heretofore, and in which the weight of the mold is reduced to a minimum.

Additional objects, advantages and features of invention will be apparent from the following description considered in conjunction with accompanying drawings illustrating the invention wherein, Figure 1 is a fragmentary sectional view of a mold constructed in accordance with our invention.

Figure 2 is a similar view illustrating the mold plates in separated positions.

Figure 3 is a plan view of a cover plate.

Figure 4 is a plan view of the mold plate.

Figure 5 is a view similar to Figure 1, illustrating a modified form of the mold.

Figure 6 is a fragmentary plan view illustrating the heel molds.

Figure 7 is a similar view illustrating the molded heels within the mold.

As shown in Figure 1, the mold comprises an upper plate 1; the mold plate 2; the central plate 3; the second mold plate 6 and the lower plate 7. The mold plates 2 and 6 include a plurality of heel cavities 4 and 5, respectively.

These plates 1, 2, 3, 6 and 7 are arranged in superposed relation as shown in Figures 1 and 2 and are maintained in proper alignment by pins or bolts 8, 9 and 10, as will now be explained. The pin 8 is screw threaded in the plate 1, upon its under face and is of a length sufficient to project into aligned apertures 8a and 8b of plates 2 and 3, respectively. The pins 9 are similarly secured in the plate 6 extending thereabove for passage into apertures 9a and 9b of the plates 3 and 2, respectively, and in addition, the pins 9 having a head portion 9c complemental to apertures 9d formed in the lower plate 7. The pin 10 screw threaded in the plate 2 is of a length projecting through apertures 10a of the plate 3; the apertures 10b of the plate 6 and the apertures 10c of the plate 7. The upper end of the pins include a head 10d (see Fig. 2) complemental to an aperture 10e of the top plate 1. Obviously, the pins will maintain the molds in alinement and permit removal of the assembled mold to the vulcanizing press.

The middle plate 3 and the bottom plate 7 include die pins 25 suitably spaced to provide nail apertures in the molded heel, and these pins will carry washers, as is customary. The pins 25 of the plate 3 will be positioned within the cavity 4, and the pins 25 of the plate 7 project into the cavity 5, as clearly shown in Figure 1.

In order that the finished heels may have the required tread surface 16, the upper faces of the plates 3 and 7 are provided with depressed designs 13, and the under face of the plates 1 and 3 are beveled as at 14, forming a depressed portion in the heels, as is customary.

The various plates are provided with cut-out portions, as indicated at 11 and 12, for the purpose of reducing weight, and these cut out portions are located at points which will not affect the strength of the molds.

In use, the plates 1, 2 and 3 are removed, exposing the cavities 5 which are filled with material forming the heels; the plate 3 is next centered upon the pins 9 with the beveled edges presented into the cavity 5. The plate 2 is next brought into registry, centered by the pins and the mold cavities 4 are filled with the molding material and finally the cover plate 1 is applied and centered. The filled mold is then placed in a vulcanizing press, as customary.

From the foregoing, it will be seen that dual mold sections are provided, doubling the production of heels as compared to single molds.

In Figure 5, we have illustrated a dual mold involving but three plates instead of five, as previously described. In this form an upper plate 17 and a lower plate 19 are provided, separated by a center plate 18. The plate 18 includes mold cavities 20 and 21 defined by a web 22 extended medially thereacross. The plates 17 and 19 include inclined faces and die pins, as described in the first form, for proper formation of the heel.

The plates 17 and 19 also include centering pins 23 and 24 respectively, complemental to a common aperture 23'.

While we have shown and described preferred forms of the invention, this is by way of illustration only, and we consider as our own all such variations as fairly fall within the scope of the appended claims.

We claim:—

1. A mold for vulcanizing rubber heels comprising mold plates having a plurality of heel cavities, a plate interposed therebetween, said plate having die pins disposed within the cavities of the upper mold plate, those portions of the plate disposed within the mold having tapered edges upon its under face, said plate further having a depressed tread design upon the upper face thereof, a bottom plate and an upper plate for closing the cavities, the bottom plate having a depressed tread design aligned with the cavities, and the upper plate having a depending portion defined by beveled edges.

2. A mold for vulcanizing rubber heels or the like comprising a pair of mold plates having a plurality of heel cavities, a plate interposed between the mold plates, a closure plate above and below the mold plates, one of the mold plates having a pin thereon of a length extending through aligned apertures of the superposed plates and one of the closure plates, the other mold plate having a pin of a length extending through aligned apertures of the interposed plate and said first named mold plate, each of said pins having a head complemental to respective apertures of the closure plates, and said closure plates having pins complemental to an aperture of one of the mold plates and an aperture of the interposed plate.

3. A mold for vulcanizing rubber heels comprising superposed mold plates, each plate having heel cavities, a plate interposed between the mold plates defining the upper wall of one cavity and the lower wall of the other cavity, closure plates for the mold plates, and means for aligning said mold, interposed and closure plates.

CARLOS HALL.
FERNANDO HALL.